United States Patent

Strähle et al.

[11] Patent Number: 6,056,043
[45] Date of Patent: May 2, 2000

[54] HEAT ACCUMULATOR FOR A VEHICLE

[75] Inventors: Roland Strähle, Unterensingen; Bernhard Stephan; Bernd Streicher, both of Filderstadt, all of Germany

[73] Assignee: Langerer & Reich GmbH, Bernhuassen, Germany

[21] Appl. No.: 08/809,093

[22] PCT Filed: Jul. 24, 1996

[86] PCT No.: PCT/DE96/01356

§ 371 Date: Mar. 18, 1997

§ 102(e) Date: Mar. 18, 1997

[87] PCT Pub. No.: WO97/06972

PCT Pub. Date: Feb. 27, 1997

[30] Foreign Application Priority Data

Aug. 18, 1995 [DE] Germany ............ 195 30 378

[51] Int. Cl.[7] ............................................. F28F 27/00
[52] U.S. Cl. .................... 165/41; 165/10; 62/59
[58] Field of Search ..................... 165/4, 10, 41, 165/104.19, 104.21; 62/59

[56] References Cited

U.S. PATENT DOCUMENTS

| | | | |
|---|---|---|---|
| 4,037,579 | 7/1977 | Chubb | 165/10 X |
| 4,064,931 | 12/1977 | Laing | 165/10 |
| 4,082,143 | 4/1978 | Thomason | 165/10 |
| 4,371,028 | 2/1983 | Helshoj | 165/10 |
| 4,408,654 | 10/1983 | Doomernik | 165/10 |
| 5,090,474 | 2/1992 | Schatz | 165/41 X |
| 5,435,380 | 7/1995 | Yamada et al. | 165/104.19 X |
| 5,465,585 | 11/1995 | Mornhed et al. | 165/10 X |

*Primary Examiner*—Christopher Atkinson
*Attorney, Agent, or Firm*—Wood, Phillips, VanSanten, Clark & Mortimer

[57] ABSTRACT

An accumulator (20) operating according to the layered storage principle is used in connection with the cooling loop of a vehicle, and includes charge alternation devices (34, 38) adapted to upper and lower storage regions (26, 28). The inflow and outflow velocity of the coolant should be between 0.1 and 0.5 m/s, and charging or discharging of the accumulator (20) should occur within 10 to 100 seconds. Inflow and outflow lines (32, 36) run within an insulation space (40) in the fashion of a thermosiphon.

14 Claims, 4 Drawing Sheets

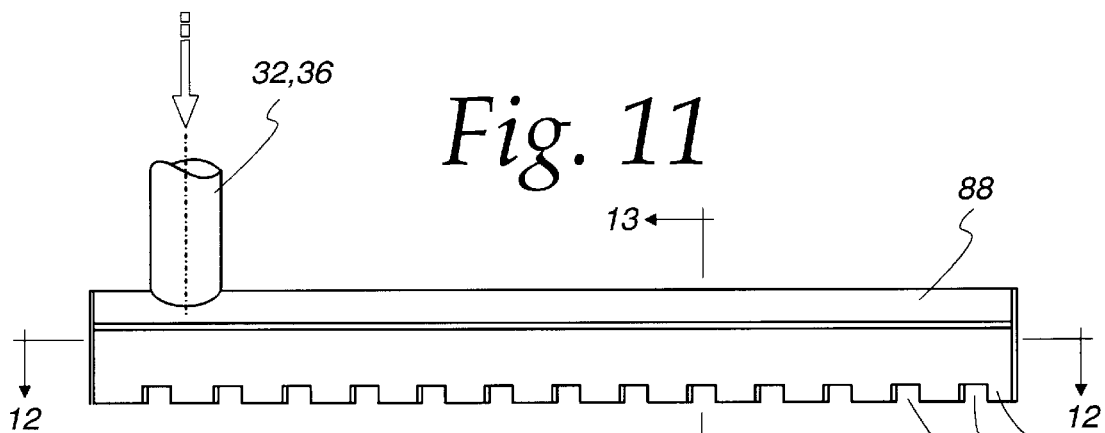
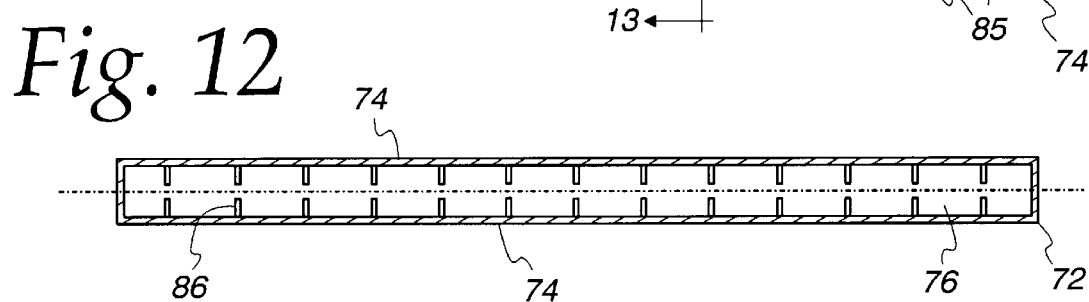
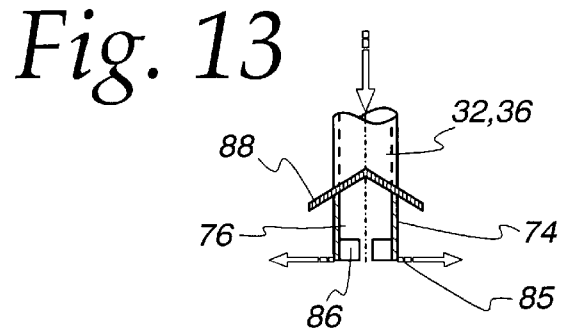
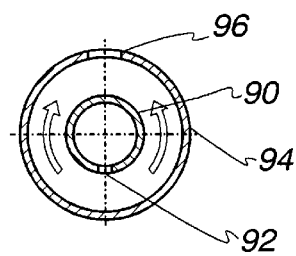
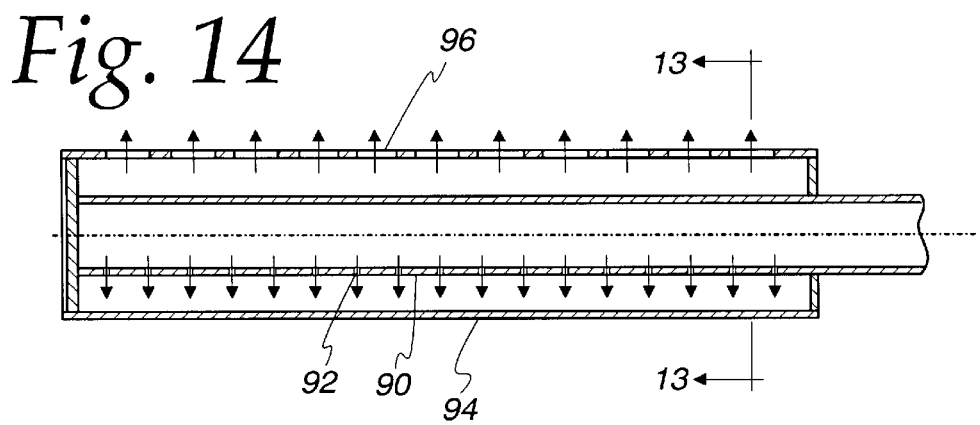

HEAT ACCUMULATOR FOR A VEHICLE

FIELD OF THE INVENTION

The invention relates to insulated heat accumulators for use in the engine coolant loops of vehicles and that can be charged and discharged repeatedly by means of a heat transfer fluid flowing through at least one inflow line and one outflow line that penetrate the insulation of the heat accumulator. The invention also concerns a method for charging and discharging this type of heat accumulator.

BACKGROUND OF THE INVENTION

One example of a heat accumulator of the general type of concern is shown in DE 40 41 626. To avoid mixing of warm fluid with cold fluid in the accumulator, this heat accumulator uses an intermediate accumulator into which cool fluid is introduced during discharge of the accumulator. The introduction of fluid into the intermediate accumulator forces warm fluid from the accumulator. The intermediate accumulator, for example, can be of a flexible bellows or piston-cylinder design. Such an accumulator is a representative of the type often referred to as a membrane accumulator, and has recently been considered to an increasing extent for use in vehicles because it has the capability of supplying large amounts of heat by avoiding mixing of cold fluid and warm fluid.

Another type of heat accumulator, which is also intended for use in vehicles, is a latent heat accumulator, which includes an inner vessel, an accumulator core in which an accumulator medium, e.g., an accumulator salt, is situated, and an outer vessel with insulation provided between the core and the outer vessel.

Advantageously, a latent heat accumulator has a large storage capacity. Offsetting this advantage, is a more limited discharge rate. Further, latent heat accumulators are quite costly to manufacture. They pose problems in terms of disposal because of the polluting nature of the storage medium. Membrane accumulators in this respect are preferred, but are still too expensive because of the membrane and the additional required plumbing. Moreover, membrane accumulators do not have an acceptable useful life. Another significant drawback of both accumulator types is that their geometry is not easily modified to accommodate irregularly-shaped installation spaces within the engine compartment of a vehicle. This is becoming increasingly important because the available space in vehicle engine compartments is diminishing as the number of components incorporated within engine compartments increases.

Another type of heat accumulator is a layered accumulator which typically is used in households and which exploits the higher density of a fluid at cooler temperatures by introducing cool fluid into a lower storage space and withdrawing warm fluid from an upper storage space, with the least possible mixing of the cool and warm fluids. Layered accumulators typically have a storage volume of many cubic meters, which is much larger than the previously discussed heat accumulators that are intended for use in vehicles. Further, layered accumulators are rarely, if ever, fully discharged. Accordingly, layered accumulators are typically subject to different constraints than heat accumulators intended for use in vehicles.

SUMMARY OF THE INVENTION

It is the principal object of the invention to provide a new and improved heat accumulator for use in the coolant loop of a vehicle, and more specifically, to provide a heat accumulator for a vehicle that is optimized in terms of heat storage capacity, with minimized mixing of warm coolant with cold coolant and minimized heat losses.

It is a further object of the invention to provide a heat accumulator that can be readily adapted to irregular installation spaces within the engine compartment of a vehicle.

It is yet another object of the invention to provide a heat accumulator at a manufacturing cost that is reduced relative to conventional heat accumulators that are intended for use in vehicles.

These objects are achieved according to the invention in a heat accumulator surrounded by insulation and adapted for use in a cooling loop of a vehicle. The heat accumulator includes first and second flow lines penetrating the insulation for transferring coolant between the heat accumulator and the cooling loop. The heat accumulator further includes structure for storing the coolant according to the layered storage principle. The structure includes an upper storage region spaced above a lower storage region. A first charge alternation device is connected to the first flow line and is located in the upper storage region. The first charge alternation device has a shape adapted to the first storage region. The first charge alternation device defines a first total flow area for transferring coolant between the first charge alternation device and the upper storage region. A second charge alternation device is connected to the second flow line and is located in the lower storage region. The second charge alternation device has a shape adapted to the lower storage region. The second charge alternation device defines a second total flow area for transferring coolant between the second charge alternation device and the lower storage region. The second total flow area is roughly the same order as the first total flow area. The first and second flow lines extend over a vertical region within the insulation to form a temperature barrier layer in the coolant between the heat accumulator and the cooling loop of the vehicle. This achieves a situation in which the temperature-barrier layer, produced by the different densities of the cooling liquid at different temperatures, is established in the vertical regions of the first and second flow lines when there is no forced coolant flow, thereby largely preventing the undesired discharge of the heat accumulator.

According to one facet of the invention, a method is provided for charging and discharging a heat accumulator for a vehicle by the simultaneous introduction and withdrawal of coolant to and from the heat accumulator. The method includes the steps of charging the heat accumulator by introducing warm coolant into the heat accumulator at a coolant flow velocity of about 0.1 to 0.5 m/s and a coolant flow rate sufficient to input at least 80% of the total amount of the heat of the accumulator within 10 to 100 seconds, and discharging the heat accumulator by introducing cold coolant into the heat accumulator at a coolant flow velocity of about 0.1 to 0.5 m/s and a coolant flow rate sufficient to output at least 80% of the total amount of the heat of the accumulator within 10 to 100 seconds.

Other objects and advantages will become apparent from the following specification taken in connection with the accompanying drawings.

BRIEF DESCRIPTION OF THE DRAWINGS

In the drawings:

FIG. 11 is a front elevation view of another elongated charge alternation device for use in the invention;

FIG. 12 is a longitudinal sectional view taken approximately along the line 12—12 in FIG. 11;

FIG. 13 is a sectional view taken approximately along the line 13—13 in FIG. 11;

FIG. 14 is a sectional view of a double tube charge alternation device for use in the invention;

FIG. 15 is a sectional view taken approximately along the line 15—15 in FIG. 14.

DETAILED DESCRIPTION OF THE PREFERRED EMBODIMENTS

Figure 1:
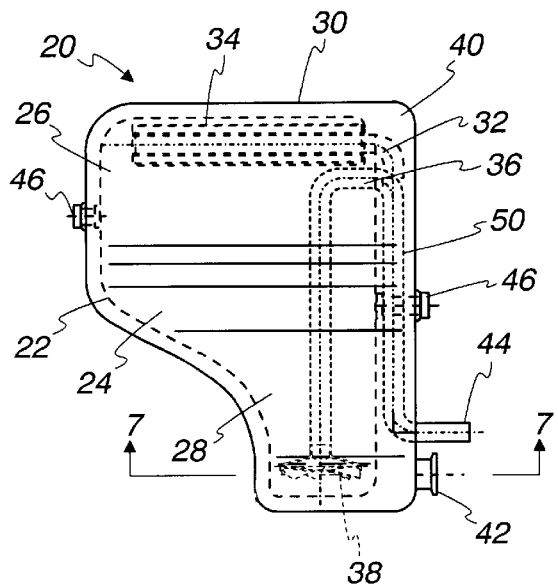
FIG. 1 is a front elevation view of a heat accumulator with an irregular shape, illustrating one embodiment of the invention.
Figure 2:
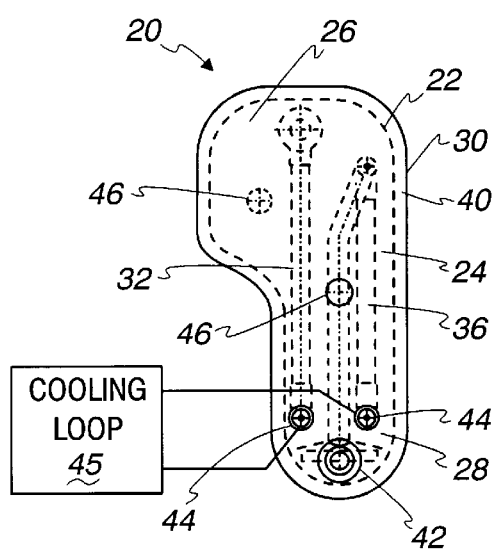
FIG. 2 is a right side elevation view of the heat accumulator of FIG. 1.

As seen in FIGS. 1 and 2, a heat accumulator 20 is provided with an irregular shape that is adapted to conform with an irregular installation space in an engine compartment of a vehicle. The heat accumulator 20 includes an inner housing 22, defining a storage volume or space 24 divided into an upper storage region 26 and a lower storage region 28. An outer housing 30 surrounds the inner housing 22 and a first flow line 32 is connected to a first charge alternation device 34 in the upper storage region 26. A second flow line 36 is connected to a second charge alternation device 38 in the lower storage region 28. The upper storage region 26 has an essentially rectangular cross-section and the first charge alternation device 34 has an elongated shape adapted to the shape of the upper storage region 26. The lower storage region 28 has an essentially square shaped horizontal cross section, and the second charge alternation device 38 has a shape adapted to the shape of the lower storage region 28. Thus, each of the charge alternation devices 34, 38 is shaped and sized to fit within its respective storage region 26, 28. The heat accumulator 20 becomes significantly larger in both length and width in the transition from the lower storage region 28 to the upper storage region 26. The heat accumulator 20 is intended to be installed in an automobile in the depicted position.

The heat accumulator 20 further includes insulation shown in the form of a vacuum insulation space 40 that is defined by the outer housing 30 and the inner housing 22. The vacuum insulation space 40 is filled with an appropriate insulation material that is introduced into the insulation space 40 via a filling connector 42 in known fashion and sealed.

Respective connectors 44 are provided on the lines 32, 36 for connection to the cooling loop 45 of a vehicle. Materials with good heat insulation properties can be used in the region where the connectors 44 and lines 32, 36 pass through the outer housing 30 to further reduce heat losses occurring by convection.

A pair of supports 46 are arranged between the inner and outer housings 22, 30 and simultaneously serve as mounting points for the accumulator 20.

After penetrating the insulation space 40 adjacent the lower storage region 28, the lines 32, 36 run upward through a vertical region 50 within the insulation space 40 and penetrate the inner housing 22 in order to enter the upper storage region 26. The vertical region 50 is of sufficient vertical height for the lines 32, 36 to act as thermosiphons wherein a temperature barrier layer is formed in the lines 32, 36 due to the differing densities of the cool and warm coolant when there is no forced flow of the coolant. The temperature barrier layer largely prevents undesired discharge of the heat accumulator 20.

For reasons of space, the line 36 penetrates the inner housing 22 just beneath the line 32. This vertical spacing has no significant adverse effect with respect to the insulation and the formation of a temperature barrier layer. The vertical spacing leads to manufacturing advantages and allows a reduction in width of the upper storage region 26.

After entering the upper storage region 26, the line 32 extends directly to the elongated charge alternation device 34, while the line 36 extends in an arc within the storage space 24 downward to the charge alternation device 38.

Figure 3:
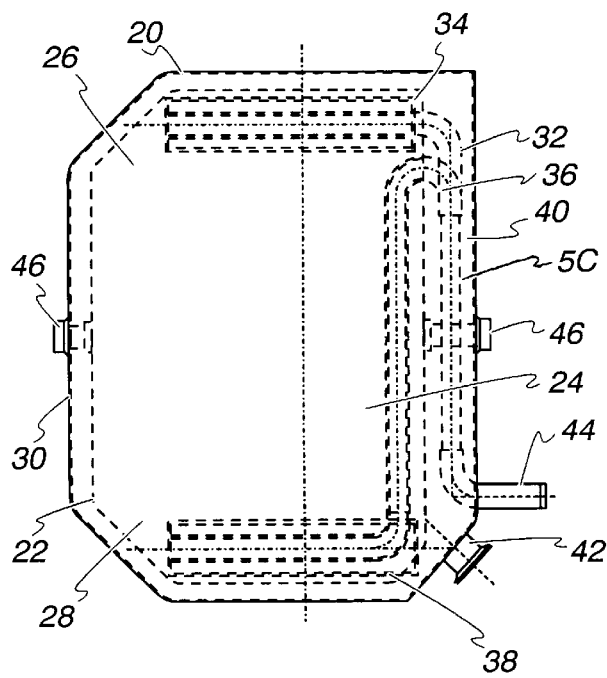
FIG. 3 is a front elevation view of a heat accumulator with the same shape in the upper and lower storage space, illustrating a second embodiment of the invention.
Figure 4:
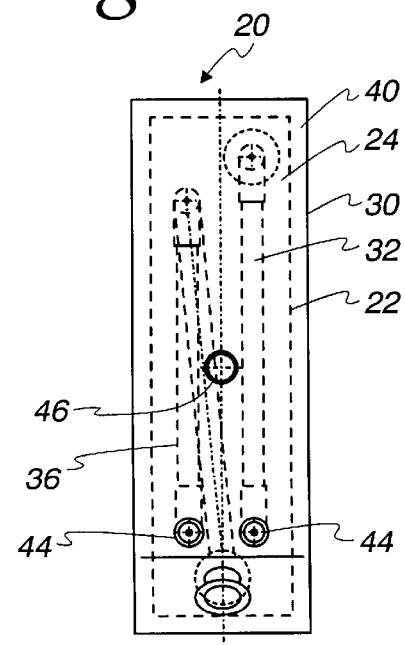
FIG. 4 is a right side elevation view of FIG. 3.

FIGS. 3 and 4 show another embodiment of the heat accumulator 20 in which essentially identical elongated first and second charge alternation devices 34, 38 are provided in the upper and lower storage regions 26, 28 because the upper and lower storage regions 26, 28 have essentially the same shape.

Figure 5:
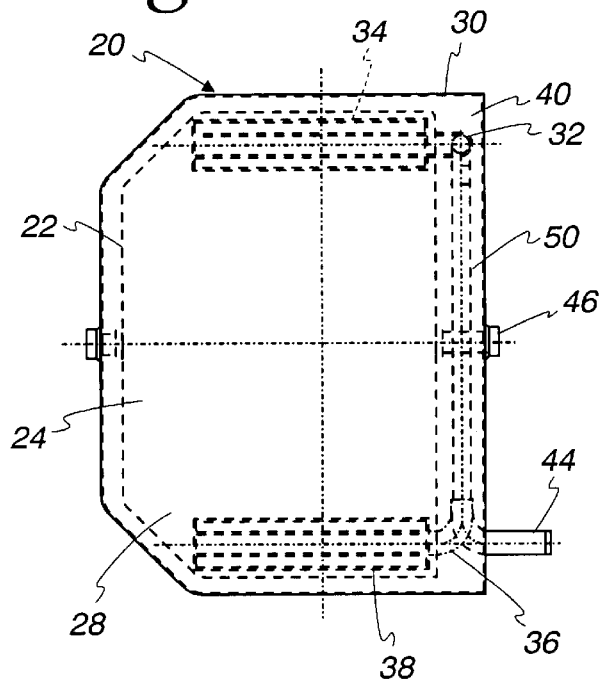
FIG. 5 is a front elevation view of a heat accumulator illustrating a third embodiment of the invention in which one flowline has an arc within the insulation and enters a lower storage space.
Figure 6:
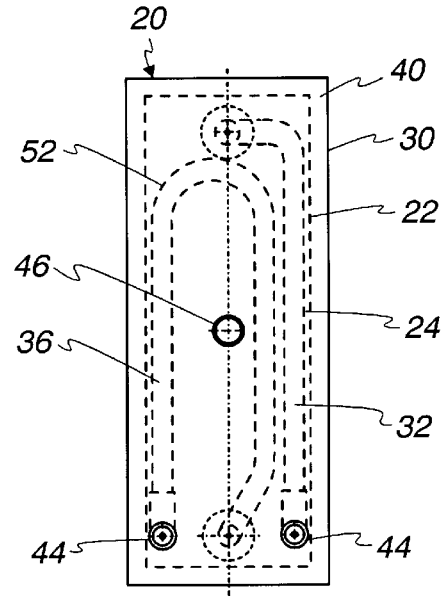
FIG. 6 is a right side elevation view of the heat accumulator of FIG. 5.

FIGS. 5 and 6 show another embodiment of the heat accumulator 20 that is similar to the embodiment in FIGS. 3 and 4, but which utilizes an alternative arrangement of the lines 32, 36. As best seen in FIG. 6, this embodiment has greater width than the embodiment of FIGS. 3 and 4. The greater width provides sufficient space for the line 36 to penetrate the insulation space 40 adjacent the lower storage region 28. The line 36 extends upwardly within the insulation space 40 over the vertical region 50 and includes an arc 52. The line 36 then extends downwardly within the insulation space 40 to enter the lower storage region 28 and connect directly to the elongated charge alternation device 38. The line 32 proceeds vertically upward within the insulation space 40 and enters the upper storage region 26, in a manner similar to the embodiments of FIGS. 1–4.

Figure 7:
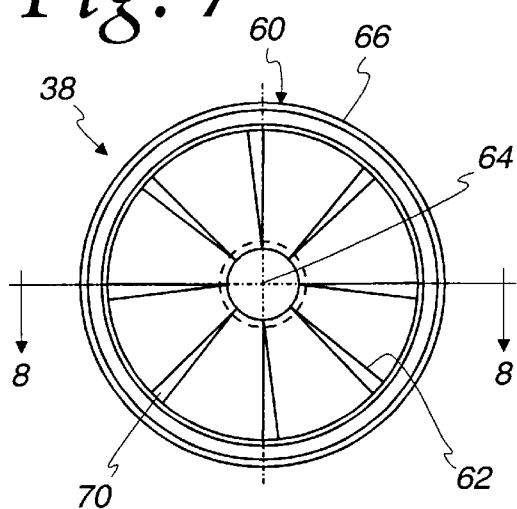
FIG. 7 is a view taken approximately along the line 7—7 in FIG. 1 of a rotary outlet charge alternation device for use in the invention.
Figure 8:
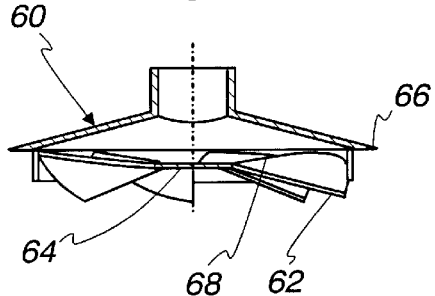
FIG. 8 is a section view taken approximately along the line 8—8 in FIG. 7.

As seen in FIGS. 7 and 8, the charge alternation device 38 connected to line 36 of the embodiment shown in FIG. 1 is designed as a rotary outlet 60 to which the line 36 is centrally connected. A plurality of vanes 62 extend radially from the center 64 to the periphery 66 of the rotary outlet 60 and are provided with a corresponding setting angle 68 to create inflow/outflow openings 70. Because of this arrangement, coolant flowing into the lower storage region 28 experiences horizontally-directed diversion and is initially distributed in the lower storage region 28, before rising upward with limited mixing with the warmer coolant present in accumulator 20.

Figure 9:
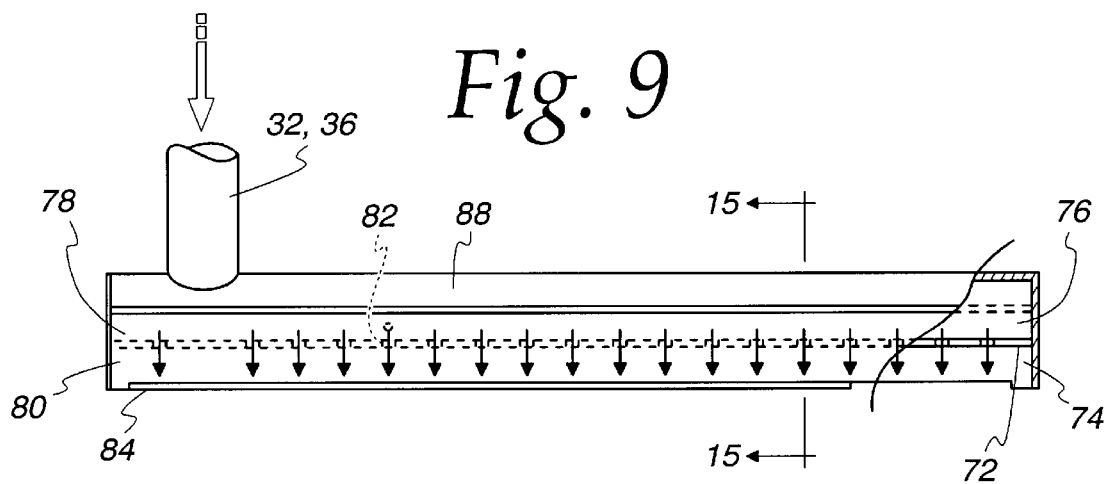
FIG. 9 is a front elevation view of an elongated charge alternation device having an intermediate level for use in the invention, with a portion of the device broken away.
Figure 10:
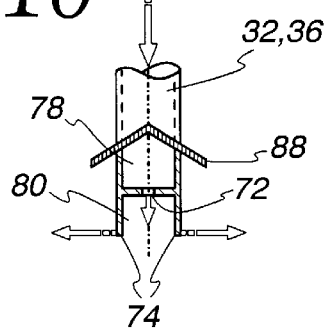
FIG. 10 is a sectional view taken approximately along the line 10—10 in FIG. 9.

FIGS. 9 and 10 illustrate an elongated charge alternation device 34, 38 suitable for use in the upper storage region 26 of the embodiment shown in FIGS. 1 and 2 and in the upper and lower storage regions 26, 28 of the embodiments shown in FIGS. 3–6. The elongated charge alternation device 34, 38 includes a horizontal intermediate wall 72 arranged between longitudinal, vertical walls 74 to divide a space 76 into an upper space 78 and a lower space 80. The intermediate wall 72 runs roughly parallel to the bottom of the upper storage region 26 and has a plurality of inflow/outflow openings 82 sized to the flow rate of the coolant so that the coolant is initially distributed in the upper space 28 before it flows further through the inflow/outflow openings 82. Inflow/outflow of the coolant into the storage space 24 occurs through inflow/outflow slits or openings 84, which are arranged on the long edges of the walls 74 adjacent the bottom of the walls 74.

FIGS. 11–13 illustrate another elongated charge alternation device 34, 38 that is suitable for use in the upper storage region 26 of the embodiment shown in FIGS. 1 and 2 and in the upper and lower storage regions 26, 28 of the embodiments shown in FIGS. 3–6. In contrast to the embodiment shown in FIGS. 9 and 10, no intermediate wall, such as the wall 72, is provided in the elongated charge alternation device 34, 38 shown in FIGS. 11–13. In this device 34, 38, the coolant is distributed in the space 76 and enters the storage space 24 through a series of inflow/outflow openings 85 in the long side of the longitudinal walls 74 adjacent to the bottom of the walls 74. Tabs 86 at one side of the openings 85 are bent inward and improve turbulence and distribution over the entire length of the charge alteration device 34, 38.

In both of the embodiments shown in FIGS. 7–11, the space 76 is bounded on the top by a closure 88 shaped like a peaked roof. The longitudinal edges of the roof closure 88 extend laterally roughly above the vertical longitudinal walls 74. This has flow advantages because the coolant flowing down at this site experiences diversion.

The components of the device 34, 38 shown in FIGS. 7–11 can be produced as extruded sections.

FIGS. 14 and 15 illustrate yet another elongated charge alternation device 34, 38 that is suitable for use in the upper storage region 26 of the embodiment of FIGS. 1 and 2 and in the upper and lower storage regions 26, 28 of the embodiment shown in FIGS. 3–6. The elongated charge alternation device 34, 38 has a double tube construction and includes an inside tube 90 having many relatively small inflow/outflow openings 92 sized so that the coolant is first distributed throughout the interior of the tube 90 before it reaches an outside tube 94. The outside tube 94 has larger inflow/outflow openings 96 which are situated on the opposite side of the device 34, 38 from the openings 92, thereby causing the coolant to travel a longer distance within the tube 94 and to enter the storage space 24 uniformly through all of the openings 96.

It should be appreciated that the flow of coolant into the storage space 24 is indirect with limited mixing of the cool and warm coolant for all of the embodiments of the charge alternation device 34, 38 shown in FIGS. 7–15. The degree of mixing depends on the inflow velocity of the coolant. The inflow velocity is therefore preferably between about 0.1 and 0.5 m/s. Extensive experiments have shown that this velocity range achieves the necessary frequent charge alternation with a satisfactorily limited degree of mixing.

Preferably, for any given accumulator 20, the sum of the areas of the inflow/outflow openings 70, 84, 85, 96, (i.e., the sum of the flow cross sections) in one of the charge alternation devices 34, 38 is of roughly the same order as the sum of the areas of the inflow/outflow openings 70, 84, 85, 96 in the other charge alternation device 34, 38 in the accumulator 20. These areas are calculated and laid out so that the coolant arriving via the lines 32, 36 is reduced in flow rate so that on entering the heat accumulator 20 the coolant exhibits the desired flow velocity of between 0.1 to 0.5 m/s. When the described charge alternation devices 34, 38 are used at this flow velocity, surprisingly good introduction of the coolant without mixing is possible and good results overall can be achieved for the proposed application.

In operation the accumulator 20 can be charged and discharged alternately with reversal of the flow direction into and out of the accumulator 20. This procedure is adequate for smaller storage volumes (roughly between 4 and 10 liters) and will primarily be used in passenger cars, since they undergo numerous starts and are frequently used for short trips. This procedure is optimized in terms of discharge and charging. During discharge, the cold coolant flows into the lower storage region 28 and the heat of the accumulator 20 is almost completely discharged and made ready for use in the shortest time (within 10 seconds) with the use of state of the art coolant pumps, which have a coolant flow rate of about 1200 L/min. Almost complete charging or discharging of the accumulator 20 means that at least 80% of the total amount of heat within the accumulator 20 is delivered within 10–100 seconds. The total amount of heat within the accumulator 20 includes heat stored in the material of the accumulator that cannot be utilized. Thus, almost all of the effectively usable heat in the coolant is discharged during the delivery period. During charging, the flow direction of the coolant is reversed, with the warm coolant flowing into the upper storage region 26 so that small amounts of heat can be rapidly supplied to the accumulator 20 while maintaining the temperature layering in the accumulator 20. Known control and regulation equipment are present in the coolant loop for reversing the flow direction. In this manner, about 80% of the total amount of heat within the accumulator 20 can be exchanged about 300 times per hour for a small storage space 24 of about 4 liters with a coolant flow rate of about 1200 L/H and about 60 times per hour for a large storage space 24 of about 10 liters with a coolant flow rate of about 600 liters per hours. In other words, a period of about 10 to 60 seconds is available for charging or discharging of the accumulator 20.

Alternatively, charging and discharging can occur without reversal of the coolant flow direction. Charging and discharging occur in this procedure by introducing the coolant into the lower storage region 28. This procedure is only optimized with respect to discharging. Optimized discharge is particularly important in heat accumulators of vehicles because supplying a large amount of stored heat as quickly as possible is desirable during a cold start to reduce exhaust emissions, passenger compartment heating, etc. In addition, this procedure utilizes less costly control technology. This procedure will be more suitable for somewhat larger storage spaces 24 of about 7 to 15 L, which provide a large amount of available stored heat and, therefore do not require rapid charging.

Figure 16:
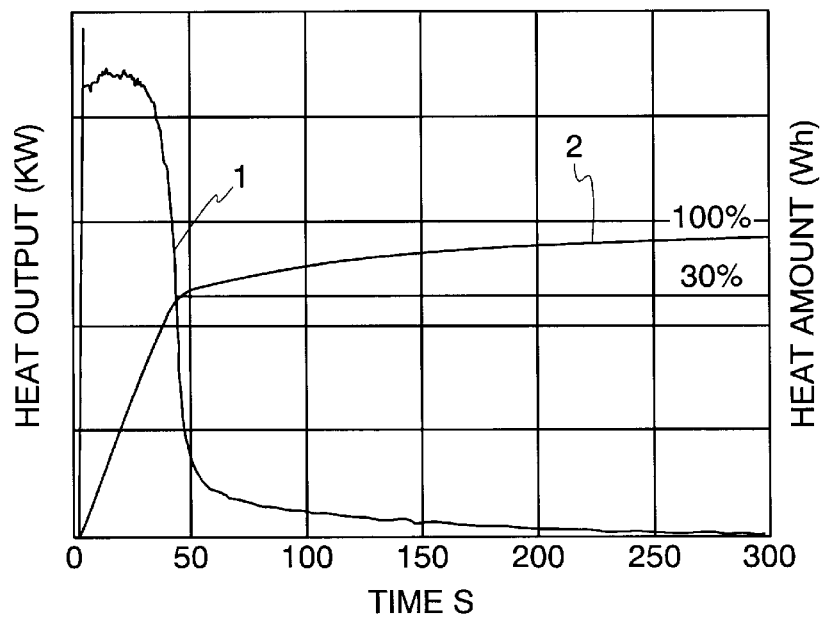
FIG. 16 is a discharge diagram illustrating the heat output and total heat content vs. time of an accumulator made according to the invention.

FIG. 16 shows a discharge diagram in which the heat output from an accumulator 20 and the total amount of heat within the accumulator 20 according to the invention are plotted versus time. The heat output remains roughly constant over a period of about 40 seconds, because the limited mixing between the warm and cold coolant during this period has no effect on the temperature of the outflowing liquid. This is shown by curve 1. Curve 2 illustrates that about 80% of the total amount of heat is released during the same time. Curve 2 then changes to a much more limited slope which shows that mixing of the warm and cold coolant is occurring.

It should be appreciated that the special configurations of the charge alternation devices 34, 38 permit introduction of the coolant essentially without mixing. It should be particularly appreciated that the charge alternation devices 34, 38 can be adapted to the configuration of the heat accumulator by using charge alternation devices 34, 38 of different design, such as the rotary outlet 60 shown in FIGS. 7, 8 and the elongated devices 34, 38 shown in FIGS. 9–15. With a longer and relatively flatter shaped heat accumulator 1, an elongated device 34, 36 such as those shown in FIGS. 9–15 is used. With an upright cylindrical shape or a roughly square cross section, a rotary outlet 60 is used as a charge alternation device 34, 38. For example, a rotary outlet 60 may exhibit the most favorable results in an upper storage region 26, whereas an elongated device proves to be the best charge alternation device 34, 38 in a lower storage region 28 (or vice-versa). Heat accumulators 20 with irregular shapes are thus made available to be mounted in cramped, irregular installation spaces within an engine compartment.

It must be viewed as quite surprising that a layered accumulator is best suited in an automobile, where there are very frequent starts and short trips that are accompanied by continuous charging and discharging of the accumulator.

The complete absence of conventional accumulator components, such as an intermediate accumulator or an accumulator core with a latent storage medium, entails distinct advantage with respect to manufacturing costs. Further, the inadequate useful life associated with conventional heat accumulators is also extended for the same reasons.

What is claimed is:

1. In a heat accumulator surrounded by insulation and adapted for use in a cooling loop of a vehicle, the heat accumulator including first and second flow lines penetrating the insulation for transferring coolant between the heat accumulator and a cooling loop of a vehicle, the improvement wherein the heat accumulator further comprises:

means for storing a coolant according to a layered storage principle, said storing means including an upper storage region spaced above a lower storage region;

a first charge alternation device connected to the first flow line and located in the upper storage region, the first charge alternation device having a shape adapted to the upper storage region, the first charge alternation device defining a first total flow area for transferring coolant between the first charge alternation device and the storing means;

a second charge alternation device connected to the second flow line and located in the lower storage region, the second charge alternation device having a shape adapted to the lower storage region, the second charge alternation device defining a second total flow area for transferring coolant between the second charge alternation device and the storing means, the second total flow area being roughly the same order as the first total flow area; and wherein each of the first and second flow lines extend over a vertical region within the insulation to form a temperature barrier layer in the coolant between the storing means and a cooling loop of a vehicle.

2. The improvement of claim 1 wherein the first and second flow lines penetrate the insulation adjacent the lower storage region, extend roughly vertically within the insulation over the vertical region, and enter the upper storage region vertically spaced from each other, the second flow line extending downward within the storing means from the upper storage region to the lower storage region to connect with the second charge alternation device.

3. The improvement of claim 1 wherein the second flow line penetrates the insulation adjacent the lower storage region, extends upward within the insulation over the vertical region to an arc section, extends downward from the arc section to a location adjacent the lower storage region, enters the lower storage region, and leads directly to the second charge alternation device.

4. The improvement of claim 1 wherein the first and second flow lines penetrate the insulation above the lower storage region, extend downward within the insulation to respective arc sections, extend upward within the insulation over the vertical region from the arc sections to adjacent the upper storage region, and enter the upper storage region, the second flow line extending downward within the storing means from the upper storage region to the lower storage region to connect with the second charge alternation device.

5. The improvement of claim 1 in combination with a cooling loop of a vehicle that can only supply coolant flow to the second flow line and receive coolant flow from the first flow line; and wherein the storing means has a volume of about 4 to 15 liters.

6. The improvement of claim 1 wherein the first and second charge alternation devices are substantially identical in shape.

7. The improvement of claim 1 wherein the upper storage region is shaped differently than the lower storage region.

8. The improvement of claim 1 wherein at least one of the first and second charge alternation devices is a rotary outlet with essentially equal length and width dimensions.

9. The improvement of claim 8 wherein the rotary outlet is circular and includes vanes extending in radial fashion from a center location to a periphery of the rotary outlet, each of the vanes set at an acute angle relative to vertical.

10. The improvement of claim 1 wherein at least one of the charge alternation devices has greater length than width and includes at least one row of flow openings for transferring flow between the at least one of the charge alternation devices and the storing means.

11. The improvement of claim 10 wherein the at least one of the charge alternation devices further comprises a outer tube, an inner tube located coaxially within the outer tube, a first row of flow openings through the inner tube, and a second row of flow openings through the outer tube.

12. The improvement of claim 10 wherein the at least one charge alternation device further comprises:

a longitudinally extending, upper closure in a shape of a peaked roof; and two laterally spaced, longitudinally extending, vertical walls connected by the upper closure to define a charge space between the walls and the upper closure, each of the walls having a long side adjacent to a surface of the storing means.

13. The improvement of claim 12 wherein each of the walls includes a series of flow openings on its long side, the flow openings defined by inwardly bent cutouts.

14. The improvement of claim 12 wherein the at least one of the charge alternation devices further comprises a longitudinally extending, horizontal wall that divides the charge space, the horizontal wall including a plurality of flow openings; and wherein each of the vertical walls includes a flow opening in the form of a slit on its long side.

* * * * *